Dec. 16, 1958 E. E. SUMNER 2,864,975

TRANSISTOR CIRCUIT FOR OPERATING A RELAY

Filed July 12, 1957 2 Sheets-Sheet 1

INVENTOR
E. E. SUMNER
BY W.L. Keefauver
ATTORNEY

INVENTOR
E. E. SUMNER
BY W. L. Keefauver
ATTORNEY

United States Patent Office 2,864,975

Patented Dec. 16, 1958

2,864,975

TRANSISTOR CIRCUIT FOR OPERATING A RELAY

Eric E. Sumner, North Caldwell, N. J., assignor to Bell Telephone Laboratories, Incorporated, New York, N. Y., a corporation of New York Application July 12, 1957, Serial No. 671,596

7 Claims. (Cl. 317—9)

This invention relates to relay circuits employing transistors.

When a transistor is employed to control the operation of a relay, one problem of concern is the transient which occurs when the relay is released. If no protective means are employed, this transient may result in sufficient overshoot of the collector voltage to damage and perhaps destroy the transistor. This problem has previously been given consideration with the resultant suggestion of circuits employing diodes or resistor-capacitor combinations to provide a dissipative path for the inductive transient.

A principal object of the invention is to simplify the circuitry necessary to protect a transistor, which is controlling the operation of a relay, from destruction which may occur if the transients, which result from the release of the relay, are sufficiently large.

Another object of the invention is to reduce the cost and bulk of such protective circuits and to avoid, for example, the use of such relatively costly or bulky items as diodes and capacitors.

Another object is to increase the efficiency of transistor protection circuits.

In accordance with one illustrative embodiment of the invention described in more detail below, collector voltage overshoot is limited to a predetermined value by employing emitter-follower configuration for the transistor which is to control the operation of the relay. The relay winding is therefore connected in series with the emitter electrode. Further, a voltage is applied to the base electrode through a series resistor, the values of the voltage and resistor being chosen in accordance with a prescribed equation to limit collector voltage overshoot. A feature of the invention is that efficient protection is achieved without the addition of costly or bulky circuit components.

The objects and features of the invention may be more fully appreciated from a consideration of the following detailed description when read in accordance with the attached drawing in which—

Figure 1:
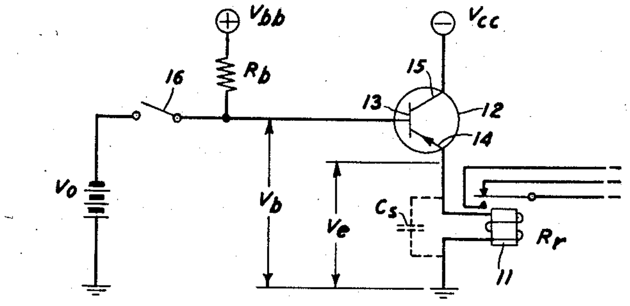
Fig. 1 is a schematic diagram of a transistor circuit for operating a relay in accordance with the principles of the invention.

Operation of the relay 11 in Fig. 1 is controlled by a transistor 12 having base 13, emitter 14, and collector 15 electrodes. Emitter-follower (alternatively referred to as common-collector) configuration is employed which means that input signals are applied to base 13; and the load, i. e., the winding of relay 11, is connected in series with the emitter 14.

The input signal in this case is illustrated merely as a source of negative voltage $V_o$ applied to the base through a switch 16. The switch may, for example, comprise another transistor but, for the present, may be considered merely as a manually operated switch. A source of positive voltage $V_{bb}$ is also connected to the base through a resistor $R_b$.

When the switch 16 is closed, the voltage of source $V_o$ is sufficient to drive the transistor into its saturation operating region which results in operation of the relay. When operated, a steady-state current $I_r$ flows through the relay winding, this current being closely $$I_r = \frac{V_{cc}}{R_r} \qquad (1)$$

where $R_r$ is the direct-current resistance of the relay winding.

When switch 16 is opened, the transistor is at first cut off by the voltage $V_{bb}$ applied to the base. This disrupts the flow of current from the source of collector potential $V_{cc}$ and thereby tends to cause the relay to release. However, the energy stored in the inductance of the relay winding must be dissipated and its transient, which arises from this dissipation, may cause the collector-to-base potential $V_{cb}$ to rise above the safe operating value for the transistor and thereby cause the collector to break down and perhaps be permanently damaged.

In accordance with the principles of the invention, however, the overshoot and potential at the collector are limited to a predetermined safe value by the voltage source $V_{bb}$ and resistor $R_b$ whose values are as prescribed below.

Figure 2:
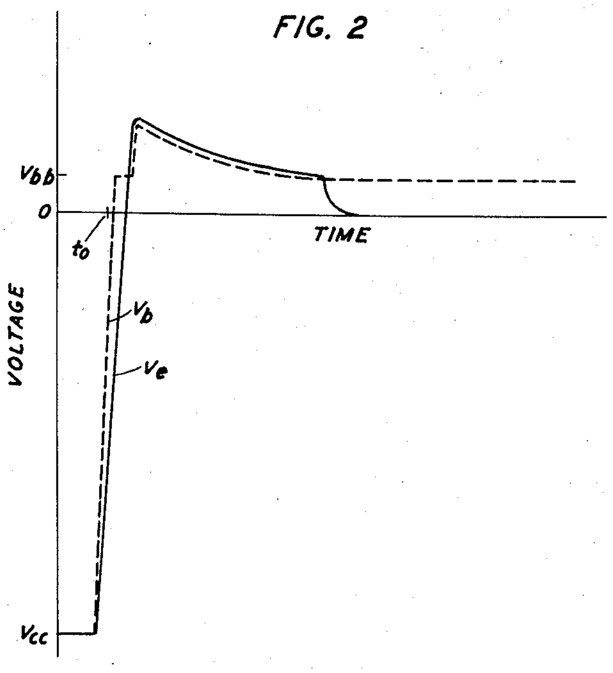
Fig. 2 is a voltage-time diagram illustrative of certain operating principles of the circuit shown in Fig. 1.

Fig. 2 illustrates certain voltages of the Fig. 1 circuit. Prior to the opening of switch 16, the base and emitter electrodes are both substantially at the potential of the collector supply $V_{cc}$. At time $t_o$, when the switch is opened, the base potential, $V_b$, rises substantially instantaneously, neglecting capacity effects, to a value $V_{bb}$, thus cutting off the transistor. Also at time $t_o$, the potential of the emitter electrode, $V_e$, rises with the incipience of the inductive transient as the energy stored in the coil starts to charge the stray capacity $C_s$ associated with the coil.

The emitter potential $V_e$ will eventually reach a value which exceeds the base potential, at which time the transistor again conducts. At this time, the base potential $V_b$ will also start to rise, differing from the emitter potential only by the small drop across the emitter-base junction. The transient will quickly pass a crest and begin to decay, the emitter potential decaying toward ground potential. When the transistor is again cut off by the decay of the emitter potential, the base potential will assume a steady-state value of $V_{bb}$.

When the transistor is conducting, with switch 16 open, the base voltage is $$V_b = V_{bb} + \frac{I_r R_b}{\beta} \qquad (2)$$

where $\beta$ is the current gain from base to emitter and is equal to $1/1-\alpha$, $\alpha$ being the current gain from emitter to collector.

Since the relay operate current, $I_r$, is approximately $V_{cc}/R_r$, then $$V_b = V_{cc}\left|\frac{V_{bb}}{V_{cc}} + \frac{R_b}{\beta R_r}\right| \qquad (3)$$

The collector-to-base voltage, $V_{cb}$, the critical voltage to be limited insofar as collector burnout is concerned, is obviously the difference between the collector voltage ($-V_{cc}$ in the circuit shown) and the base voltage $V_b$; or, $$V_{cb} = V_c - V_b = -V_{cc} - V_{cc}\left|\frac{V_{bb}}{V_{cc}} + \frac{R_b}{\beta R_r}\right| \qquad (4)$$

Since $V_{cc}$ is usually fixed by other considerations, protection is achieved by limiting the overshoot factor $$\left(\text{i. e., } \frac{V_{bb}}{V_{cc}} + \frac{R_b}{\beta R_r}\right)$$

to a safe percentage N. Further, since $\beta$ and $R_r$ are also more or less fixed, values are chosen for $V_{bb}$ and $R_b$ in accordance with the invention, so that the overshoot is limited to a safe value for the particular transistor employed. That is, $V_{bb}$ and $R_b$ are proportioned so that:

$$\frac{V_{bb}}{V_{cc}}+\frac{R_b}{\beta R_r}\approx\frac{N}{100} \quad (5)$$

For example, assume that transistor 12 can safely withstand an overshoot of 20 percent, beyond $V_{cc}$, and that $V_{cc}=-20$ volts
$\beta=100$, and
$R_r=1k$ Then, assuming a base voltage $V_{bb}$ of +2 volts, it may be seen that a resistor $R_b$ of $10k$ will achieve the desired protection. Resistor $R_b$ is preferably substantially equal to this value; if too large, the overshoot will be excessive, and if too small, it will unduly increase the operate current through switch 16.

Certain other considerations must be taken into account, of course, in selecting $V_{bb}$ and $R_b$. For example, the forward drop of the emitter-to-base junction, and the leakage characteristics of the transistor may be somewhat modifying. Also, the reverse base drive current supplied by $V_{bb}$ and $R_b$ must be sufficient to provide $I_{co}$ for the transistor when the switch 16 is open.

In those cases where $V_{bb}$ is fixed by other considerations, the value of $R_b$ is readily determined; $R_b$ in such cases should be substantially equal to, or slightly less than $$\beta R_r\left(\frac{N}{100}-\frac{V_{bb}}{V_{cc}}\right)$$

Figure 3:
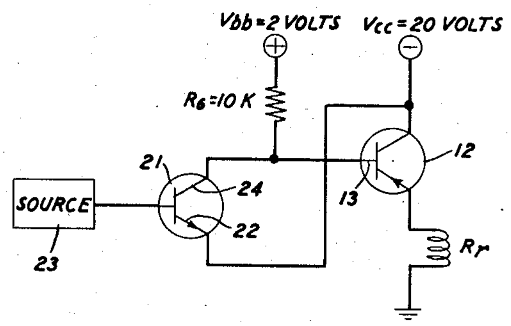
Figs. 3, 4, and 5 are further circuits illustrating principles of the invention.
Figure 4:
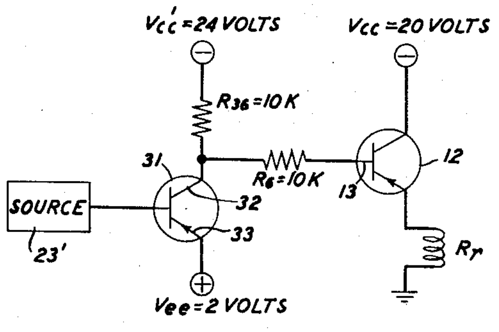
Figure 5:
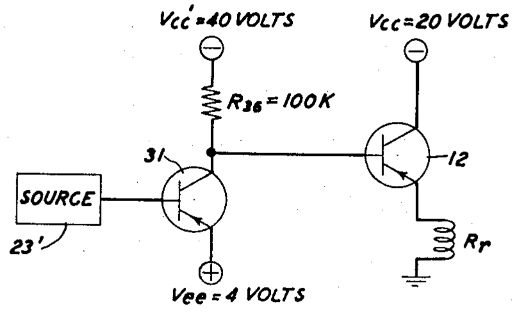

Figs. 3, 4, and 5 illustrate principles of the invention in several practical circuits. (Numbers like those in Fig. 1 identify similar elements.) In these circuits, the switch 16 of Fig. 1 is replaced by a transistor switch.

The switch in Fig. 3 comprises a second transistor 21 of conductivity type opposite to that of transistor 12. The emitter 22 of transistor 21 is tied to the collector supply $V_{cc}$ of transistor 12 so that, in the absence of input signals from source 23, transistor 21 is biased to saturation. Collector 24 of transistor 21 in the saturation condition will also be at approximately −20 volts due to the very small collector-to-emitter resistance in the saturation condition. Since the base of transistor 12 is direct-coupled to collector 24, base 13 is also at −20 volts and transistor 12 is also in the saturation condition.

When signals from source 23, which may, for example, comprise negative pulses, are applied to cut off transistor 21, transistor 12 is also cut off and the relay (indicated merely by its winding designation $R_r$) releases. In accordance with principles of the invention and as discussed in connection with Fig. 1, the overshoot in the collector-to-base voltage of transistor 12 is limited to an assumed safe value of 20 percent by the source $V_{bb}$ of two volts which is applied to the base of transistor 12 through resistor $R_b$ of a value substantially equal to 10,000 ohms. With these parameters, the collector-to-base voltage of transistor 12 during the inductive transient when the relay releases, will be limited to 24 volts.

Fig. 4 illustrates another embodiment in which transistors of like conductivity types are employed. In this embodiment, the transistor switch comprises transistor 31 while transistor 12 is again employed to drive the relay. In the absence of signals from source 23′, transistor 31 is in saturation due to the two-volt forward emitter bias $V_{ee}$. When saturated, the collector 32-to-emitter 33 resistance is very small so that the collector 33 is also substantially at +2 volts. Since the emitter of transistor 12 is returned through the relay winding to ground potential, transistor 12 is cut off by this two-volt base bias and the relay is released.

When signals from source 23, which may, for example, comprise positive pulses, drive transistor 31 to cut off, the collector of transistor 31 rises towards $V_{cc}'$ or −24 volts, thereby driving transistor 12 to saturation and operating the relay. When the positive input pulses cease, the relay releases.

In this configuration, the $V_{bb}$ of the overshoot factor is the +2 volts of $V_{ee}$ since it is this voltage which is applied to the base of transistor 12 when the latter is cut off and the potentially harmful transient occurs. Resistor $R_b$ is thus connected between the collector 32 of transistor 31 and the base 13 of transistor 12. The $R_b$ of Equation 5 should technically include the total resistance of the circuit connecting $V_{ee}$ to the base of transistor 12. However, the saturation collector-to-emitter resistance of transistor 31 is so small that it can be neglected. Therefore, assuming again a safe maximum collector overshoot of 20 percent, it can be seen from the above that $R_b$ should have a value approximately equal to:

$$\beta R_r\left(\frac{N}{100}-\frac{V_{bb}}{V_{cc}}\right)$$

of 10,000 ohms.

To assure saturation of transistor 12 when the relay is to be operated, the value for resistor 36 can be determined from the following relationship:

$$\frac{V_{cc}'-V_{cc}}{R_b+R_{36}}=\frac{I_R}{\beta} \quad (6)$$

Assuming a value for $V_{cc}'$ of −24 volts, it can be seen that resistor 36 should also be 10,000 ohms. ($I_R$ is 2 milliamperes with $V_{cc}$ equal to 20 volts and $R_r$ equal to 1,000 ohms; $\beta$, as noted above, is assumed to be 100.)

At some sacrifice in speed of relay release, $R_b$ can be omitted with the resulting configuration as shown in Fig. 5. With $R_b$ equal to zero (neglecting the base resistance of transistor 12 and the small collector-emitter resistance of transistor 31 in the saturation condition), $V_{bb}$ (actually $V_{ee}$ in this configuration) may be 20 percent (the desired maximum overshoot) of $V_{cc}$ or four volts. Assuming in this case a collector voltage $V_{cc}'$ of the transistor switch 31 of −40 volts, resistor 36 should, from Equation 5, have a value of 100,000 ohms.

Although the invention has been described in relation to specific embodiments, the embodiments shown and described are intended to be illustrative only. Numerous other embodiments and modifications will readily occur to one skilled in the art without departing from either the spirit or the scope of the invention.

What is claimed is:

1. A transistor circuit for operating a relay having at least a winding comprising a transistor having base, emitter, and collector electrodes, a circuit including said winding connected between said emitter and a point of fixed potential, a source of voltage $V_{cc}$ connected to said collector, means for applying signals to operate said relay to an input circuit connected between said base and said point of fixed potential, and means for limiting the collector-to-base voltage to a predetermined safe value regardless of inductive transients which may occur when said relay releases, said safe value being N per cent greater than said voltage $V_{cc}$, said last-named means comprising a source of voltage V and a circuit for applying said voltage V to said base electrode, said voltages V and $V_{cc}$ being related as follows:

$$\frac{V}{V_{cc}}\approx\frac{N}{100}-\frac{R_b}{\beta R_r}$$

where $R_b$ is the resistance of said circuit means, $\beta$ is the base-to-emitter current gain of said transistor and $R_r$ is the effective series resistance of said winding.

2. In combination a source of signals, an inductive load, a transistor having base, collector, and emitter electrodes and being subject to damage by excessive collector voltage, means for applying said signals between said base and a point of reference potential, a source of collector voltage $V_{cc}$ connected to said collector, means connecting said load between said emitter and said point of reference potential, whereby said collector-to-base voltage tends to increase beyond said value $V_{cc}$ as a result of inductive transients which occur when the voltage across said load is reduced in response to said signals, and means for limiting the overshoot in said collector-to-base voltage to a safe percentage, N, of said collector voltage comprising a resistor $R_b$ and a source of voltage $V_{bb}$, means for applying voltages from said source to said base through said resistor, said base voltage $V_{bb}$ and said resistor $R_b$ having values to satisfy the following relation:

$$\frac{N}{100} \approx \frac{V_{bb}}{V_{cc}} + \frac{R_b}{\beta R_r}$$

where $R_r$ is the effective series resistance of said inductive load and $\beta$ is the base-to-emitter current gain of said transistor.

3. In combination, a source of electrical signals, a relay having a winding and means for operating said relay in response to said signals comprising a pair of transistors of opposite conductivity type, each having a base, emitter, and collector electrode, means for applying said signals to the base of a first of said transistors, means connecting the collector of said first transistor to the base of said second transistor, a circuit including said winding, the emitter of the second of said transistors and a point of fixed potential, a source of voltage $V_{cc}$ connected to the collector of said second transistor, means for biasing said first transistor in the absence of said signals in the saturation condition and means for limiting the collector-to-base voltage overshoot of said second transistor to a safe percentage, N, of said voltage $V_{cc}$ comprising a source of voltage $V_{bb}$ and a resistor $R_b$ connected in series and to the base electrode of said second transistor, said voltage $V_{bb}$ and said resistor $R_b$ having values to satisfy the following relation:

$$\frac{N}{100} \approx \frac{V_{bb}}{V_{cc}} + \frac{R_b}{\beta R_r}$$

where $R_r$ is the effective series resistance of said inductive load and $\beta$ is the base-to-emitter current gain of said transistor.

4. In combination, a source of signals, a relay having a winding and a pair of like conductivity type transistors each having a base, collector, and emitter electrode, means for applying said signals between the base electrode of a first of said transistors and a point of reference potential, means connecting the winding of said relay between the emitter of the second of said transistors and said point of reference potential, means for applying a voltage $V_{cc}$ to the collector of said second transistor, means for applying a voltage $V_{ee}$ to the emitter of said first transistor, said voltage $V_{ee}$ having a value and polarity sufficient to drive said first transistor to saturation in the absence of said signals, and means for limiting the overshoot in potential at the collector of said second transistor when said relay releases to a predetermined safe percentage N of said voltage $V_{cc}$ comprising a resistor $R_b$ connected between the collector of said first transistor and the base of said second transistor and having a value substantially equal to:

$$\beta R_r\left(\frac{N}{100} - \frac{V_{ee}}{V_{cc}}\right)$$

where $R_r$ is the effective series resistance of said inductive load and $\beta$ is the base-to-emitter current gain of said transistor.

5. The combination in accordance with claim 4 and a second resistor connected between a source of voltage $V_{cc}'$ and the collector of said first transistor, said second resistor having a value substantially equal to:

$$\frac{\beta R_r}{V_{cc}}(V_{cc}' - V_{cc}) - R_b$$

6. In combination, a relay having at least a winding, a source of signals and means for operating said relay in response to said signals comprising a pair of transistors of like conductivity type and each having a base, collector, and emitter electrode, means for applying said signals to the base electrode of a first of said pair of transistors, a substantially direct connection between the collector of said first transistor and the base electrode of the second of said transistors, means including said winding in a circuit connected between the emitter of said second transistor and a point of fixed potential, a source of voltage $V_{cc}$ connected to the collector of said second transistor and means for limiting the overshoot in the collector voltage due to inductive transients which occur when said relay releases to a predetermined safe percentage N of said collector voltage $V_{cc}$ comprising a source of voltage $V_{ee}$ connected to the emitter electrode of said first transistor, said voltage $V_{ee}$ being N percent of said voltage $V_{cc}$, and sufficient in magnitude to drive said first transistor to saturation and said source of signals being sufficient in voltage to drive said first transistor to cut off.

7. The combination in accordance with claim 6 and a source of voltage $V_{cc}'$ and means including a resistor R for applying said voltage $V_{cc}'$ to the collector electrode of said first transistor, said resistor R being substantially equal to:

$$\frac{\beta R_r}{V_{cc}}(V_{cc}' V_{cc}) - R_b$$

No references cited.